United States Patent
Chen

(10) Patent No.: US 7,262,589 B2
(45) Date of Patent: *Aug. 28, 2007

(54) PULSE WIDTH MODULATION POWER REGULATOR AND POWER SUPPLY SYSTEM THEREOF

(75) Inventor: An-Tung Chen, Taoyuan County (TW)

(73) Assignee: Winbond Electronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/307,216

(22) Filed: Jan. 27, 2006

(65) Prior Publication Data

US 2006/0197515 A1    Sep. 7, 2006

Related U.S. Application Data

(63) Continuation of application No. 10/707,445, filed on Dec. 15, 2003, now Pat. No. 7,019,500.

(51) Int. Cl.
    *G05F 1/40* (2006.01)
    *H02H 7/00* (2006.01)
(52) U.S. Cl. ..................................... 323/282
(58) Field of Classification Search .............. 323/238, 323/240, 245, 268, 271, 282, 285–287; 361/18, 361/42, 45, 49, 50, 88, 91.1, 93.1, 93.8
    See application file for complete search history.

(56) References Cited

U.S. PATENT DOCUMENTS

| | | | | |
|---|---|---|---|---|
| 4,768,216 A | * | 8/1988 | Harvey et al. | 378/110 |
| 4,899,269 A | * | 2/1990 | Rouzies | 363/41 |
| 6,100,675 A | * | 8/2000 | Sudo | 323/282 |
| 6,198,265 B1 | * | 3/2001 | Stevenson | 323/288 |
| 7,045,993 B1 | * | 5/2006 | Tomiyoshi | 323/224 |

* cited by examiner

*Primary Examiner*—Matthew V. Nguyen
(74) *Attorney, Agent, or Firm*—Jianq Chyun IP Office

(57) ABSTRACT

A pulse width modulation (PWM) power regulator and a power supply system thereof are disclosed. The power supply system includes a central controller having a soft-starting circuit and at least one PWM power regulator, wherein the central controller and the PWM power regulator are connected with a control signal wire. The PWM power regulator includes an error amplifier, a comparative circuit, and a PWM output stage, a switch and a fault detection circuit. The control signal wire of the invention requires a single control wire to provide a signal for controlling the PWM power regulator. Therefore, the circuit design and the control process of the pulse width modulation (PWM) power regulator and power supply system thereof can be simplified.

17 Claims, 4 Drawing Sheets

PULSE WIDTH MODULATION POWER REGULATOR AND POWER SUPPLY SYSTEM THEREOF

CROSS-REFERENCE TO RELATED APPLICATION

This application is a Continuation application of Ser. No. 10/707,445, filed on Dec. 15, 2003 now U.S. Pat. No. 7,019,500, which claims the priority benefit of Taiwan application serial no. 92130408, filed on Oct. 31, 2003.

BACKGROUND OF THE INVENTION

1. Field of the Invention

The present invention relates to a power regulator and a power supply system thereof, and more particularly to a pulse width modulation (PWM) power regulator and a power supply system thereof.

2. Description of the Related Art

In all of the electronic devices, a power supply is a major and necessary component. In general, when a variety of electronic components are combined in an electronic device, the power supply system of the electronic device is required to provide a variety of powers with different waveforms, and thus a conventional device, a primary and a secondary power supply system are used. FIG. 1 is a schematic drawing illustrating a conventional power supply system. In general, a conventional primary and secondary power supply system 100 are composed of a power system central controller 102 and a plurality of remoter controlled PWM power regulators 104 for outputting voltages Vout1 to VoutN. Each of the PWM power regulators 104 is connected to the power supply central controller 102 via a corresponding control signal wire 106. The power supply system can be, for example, applied to the computers. Basically, the power is applied to different loads, such as a CPU, a memory, or a display interface, through the power system central controller 102 and a plurality of remote controlled PWM power regulators 104. In general, different loads have different requirements regarding power, voltage, current or switch timing. Therefore, each remote controlled PWM power regulator is designed with different specification respectively.

Generally, the control signal wire 106 is composed of at least four signal wires for transmitting four signals: a reference voltage Vref, an enable signal En, a Power OK signal, and a fault signal. FIG. 2 is a circuit block diagram showing a prior art remote controlled PWM power regulator of a power supply system. The remote controlled PWM power regulator 104 comprises an error amplifier (EA) 202, an output soft-starting clamp circuit 204, a PWM output stage 206, an LC filter 208, a power ready detecting circuit 210 and a fault detection circuit 212.

Referring to FIG. 2, the error amplifier 202 receives and compares the reference voltage Vref and the output voltage Vout for outputting an error signal. The output soft-starting clamp circuit 204 is provided for clamping the rise of the output voltage of the error amplifier 202 when the power regulator 104 is triggered to avoid the over current of the output capacitor. The PWM output stage 206 is controlled by the enable signal En. After receiving the error signal, the PWM output stage 206 adjusts a duty cycle of the output waveform for generating an average voltage substantially similar to the reference voltage Vref. The LC filer 208 is provided for filtering the average output voltage of the PWM output stage 206. The power ready circuit 210 is provided for informing the power supply central controller 102 that the output voltage Vout has reached a target voltage via the Power OK signal since the output voltage Vout cannot immediately reach the target voltage due to the operation of the clamp circuit 204. The fault detection circuit 212 is provided for detecting fault conditions, such as over current, over voltage, or over temperature, within the power supply regulator 104.

Accordingly, the four signal wires of FIG. 2 have the following functions. First, the voltage reference signal wire transmits the reference voltage Vref from the power supply central controller 102 to the error amplifier 202, and the reference voltage Vref is provided as a target value of the output voltage Vout of the power supply regulator 104. Secondly, the enable signal wire transmits the enable signal En from the power supply central controller 102 to turn on or off the clamp circuit 204 and the PWM output stage 206. Thirdly, the Power OK signal wire informs the power supply central controller 102 that the output voltage has reached the target value via the Power OK signal from the PWM power regulator 104. Fourthly, the fault signal wire informs the power supply central controller 102 that a fault, such as over current, over voltage, or over temperature has been detected within the power supply regulator 104 via the fault condition signal Fault from the power regulator 104.

FIG. 3 is a waveform diagram illustrating the signals transmitted between the central controller and the remote PWM power regulator of a conventional power supply system. Referring to FIG. 3, when the reference voltage Vref is raised from the ground voltage Vss to the target voltage Vcc, the enable signal En is triggered to turn on the clamp circuit 204 and the PWM output stage 206. After the filtering of the LC filter 208, the output voltage Vout is generated. The slope of the output voltage Vout is controlled by the clamp circuit 204 and is irrelevant to the waveform of the reference voltage Vref. When the output voltage Vout reaches, for example, about 90% of the target voltage Vcc, the Power OK signal is triggered and the power supply central controller 102 is informed that the output voltage Vout has reached the target voltage Vcc. When a fault condition is detected within the PWM power regulator 104, the fault signal Fault is triggered and the power supply central controller 102 is informed of the fault condition.

Accordingly, in the power supply system 100 of the prior art, the number of the control signal wires increases with the number of the remote controlled PWM power supply regulator 104, and each control signal wire 106 has four signal wires. In recent years, since the minimization of size and design of the electronic devices is highly desirable, and therefore simplification of the design and reduction in the number of signal wires of the power system is accordingly highly desirable.

SUMMARY OF THE INVENTION

Accordingly, one object of the present invention is to provide a pulse width modulation (PWM) power regulator having a simple design with reduced number of signal wires.

Another object of the present invention is to provide an power supply system for including the simplified power regulator having reduced number of control signal wires therein.

In order to achieve the above objects and other advantages of the present invention, a PWM power regulator is provided. The PWM power regulator comprises an error amplifier, a comparative circuit, and a PWM output stage, a switch and a fault detection circuit. The error amplifier is provided for receiving a control signal from a control signal wire and an output voltage of the PWM power regulator. The comparative circuit is connected to the control signal wire for outputting an internal enable signal according to a pre-set threshold voltage. The PWM output stage is connected to the error amplifier and the comparative circuit for outputting the output voltage according to a triggering of the internal enable signal. The switch is connected to the control signal wire and the ground. The fault detection circuit is connected to the switch for outputting an internal fault signal to trigger the switch to ground the control signal when a fault condition within the PWM signal power regulator is detected.

In accordance with the other objects and advantages of the present invention, a power supply system is provided. The power supply system comprises a central controller having at least one soft-starting circuit and, at least one PWM power regulator. The PWM power regulator is connected to the soft-starting circuit via a control signal wire. The PWM power regulator comprises an error amplifier, a comparative circuit, and a PWM output stage, a switch and a fault detection circuit. The error amplifier is provided for receiving a control signal from a control signal wire and an output voltage of the PWM power regulator. The comparative circuit is connected to the control signal wire for outputting an internal enable signal according to a pre-set threshold voltage. The PWM output stage is connected to the error amplifier and the comparative circuit for outputting the output voltage according to a triggering of the internal enable signal. The switch is connected to the control signal wire and the ground. The fault detection circuit is connected to the switch for outputting an internal fault signal to trigger the switch to ground the control signal when a fault condition within the PWM signal power regulator is detected. The fault of the PWM power regulator is detected by the central controller when the grounded control signal is detected by the central controller.

In an embodiment of the present invention, the control signal wire of the power supply system has only one signal wire.

In an embodiment of the present invention, the PWM power regulator further includes, for example but not limited to, a filter connected to the PWM output stage for filtering the output voltage.

In an embodiment of the present invention, the error amplifier has a common mode input range is about 0 V to about a target voltage.

In an embodiment of the present invention, the predetermined threshold voltage is in a range of about 5% to about 10% of a target voltage, or in a range of about 0.05 V to about 0.5V.

In an embodiment of the present invention, the fault conditions includes an over current condition, an over voltage condition or an over temperature condition.

Accordingly, the power supply system and the remote control PWM signal regulator of the invention have at least the following advantages. First, the control signal wire of the present invention only requires a signal wire for transforming the control signal compared to the prior art control signal wire which requires at least four signal wires. Secondly, the present invention uses at least one soft-starting circuit within the central controller of the power supply system for outputting the control signal to the PWM power regulator, and therefore, the PWM signal regulator of the present invention does not need a soft-starting clamp circuit. Therefore, the circuit design of the PWM signal regulator can be significantly simplified. Moreover, the PWM signal regulators that have the same waveform of output voltage nay use the same soft-starting circuit. Thirdly, the central controller of the power supply system is capable of determining the condition of the output voltage of the PWM signal regulator by detecting the control signal without requiring an additional conventional Power OK signal wire. Fourthly, when any fault condition is detected within the remote control PWM signal regulator, the control signal is grounded. The central controller may detect the grounded control signal to detect the fault of the PWM power regulator without requiring an additional conventional fault signal wire.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF SOME EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 4:
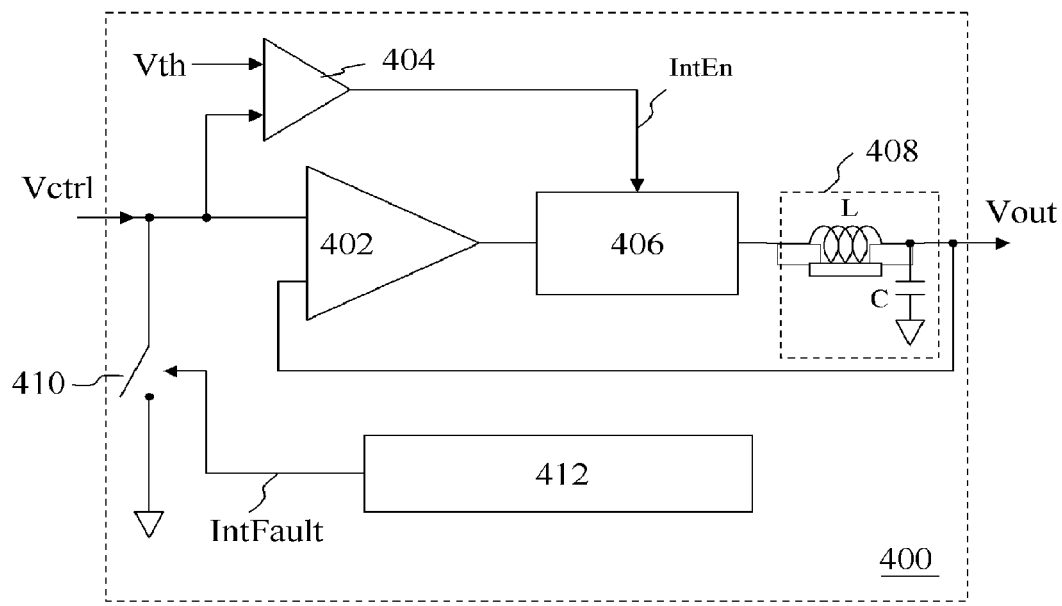
FIG. 4 is a block diagram schematically illustrating a remote pulse width modulation (PWM) power regulator of a power supply system according to an embodiment of the present invention.

FIG. 4 is a block diagram schematically illustrating a remote pulse width modulation (PWM) power regulator of a power supply system according to an embodiment of the present invention. Referring to FIG. 4, the PWM power regulator 400 comprises an error amplifier (EA) 402, a comparative circuit 404, a PWM output stage 406, and an LC filter 408, a switch 410 and a fault detection circuit 412.

Referring to FIG. 4, when a control signal Vctrl is inputted to the power regulator 400, the control signal Vctrl is inputted to the error amplifier 402 and the comparative circuit 404. The comparative circuit 404 is controlled by a predetermined threshold voltage Vth. When the control signal Vctrl is larger than the threshold voltage Vth, the comparative circuit 404 outputs an internal enable signal IntEn to activate the PWM output stage 406. When the control signal Vctrl is smaller than the threshold voltage Vth, the comparative circuit 404 outputs another internal enable signal IntEn 10 disable the PWM output stage 406. It is noted that, in comparison with a conventional PWM power regulator, the error amplifier 402 of the present invention has a more wider common mode input range in a range of about 0V to about a target voltage Vcc. Therefore, the error amplifier 402 can be controlled by the control signal Vctrl and the output voltage Vout feedback from the power regulator 400 in order to precisely respond to the variation of the control signal Vctrl. Therefore, when the PWM output stage 406 is activated by the internal enable signal IntEn, the output voltage Vout can precisely vary with the waveform of the control signal Vctrl. The internal enable signal IntEn is generated from the pre-set threshold voltage Vth. Generally, the threshold voltage may be set at a voltage little larger than the ground voltage Vss, but much smaller than the target voltage Vcc. For example, the pre-set threshold voltage Vth is set in a range of about 5% to about 10% of a target voltage Vcc, or in a range of about 0.05 V to about 0.5 V. The pre-set threshold voltage Vth depends on the target voltage Vcc. When the control signal Vctrl arises, the internal enable signal IntEn is triggered almost at the same time. Therefore, the output voltage Vout and the control Vctrl are almost generated at the same time and substantially have the same slopes. Thus, in the present invention, a Power OK signal provided in the prior art for informing the central controller 102 about that the output voltage Vout has reached the target voltage Vcc for application is no more required.

Referring to FIG. 4, the LC filter 408 is provided for filtering the average output voltage of the PWM output stage 406. The fault detection circuit 412 is provided for detecting any fault condition, such as over current, over voltage, or over temperature, within the power regulator 400 and for generating an internal fault signal IntFault. In the present invention, the internal fault signal IntFault is inputted to switch 410 to ground the control signal Vctrl.

Figure 5:
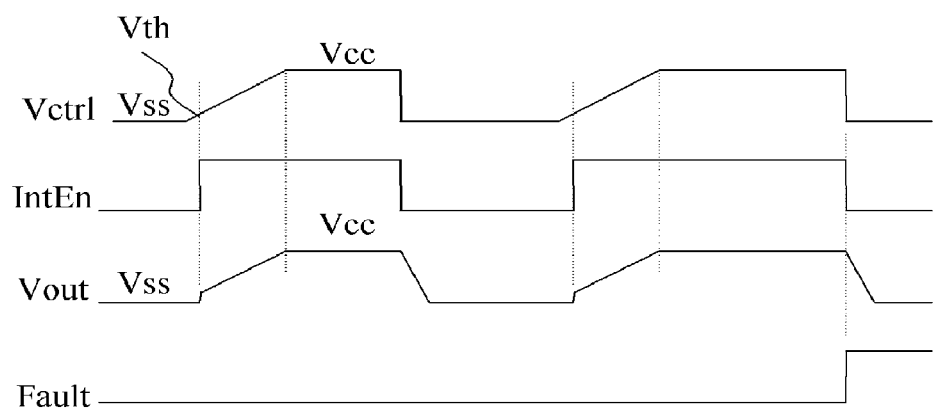
FIG. 5 is a waveform diagram illustrating the signals transmitted between the central controller and the remote PWM power regulator according to an embodiment of the present invention.

FIG. 5 is a waveform diagram illustrating the signals transmitted between the central controller and the remote PWM power regulator according to an embodiment of the present invention. Referring to FIG. 5, when the control signal Vctrl is larger than the threshold voltage Vth, the comparative circuit 404 outputs an internal enable signal IntEn to activate the PWM output stage 406. After the signal outputted from the PWM output stage 406 is filtered by the LC filter 408, an output voltage Vout is generated. It is noted that the rising slope of the output voltage Vout from ground voltage Vss to the target voltage Vcc is substantially similar to that of the control signal Vctrl. When a fault condition occurs within the power regulator 400, the internal fault signal IntFault is triggered and inputted to the switch 410 to ground the control signal Vctrl.

Figure 6:
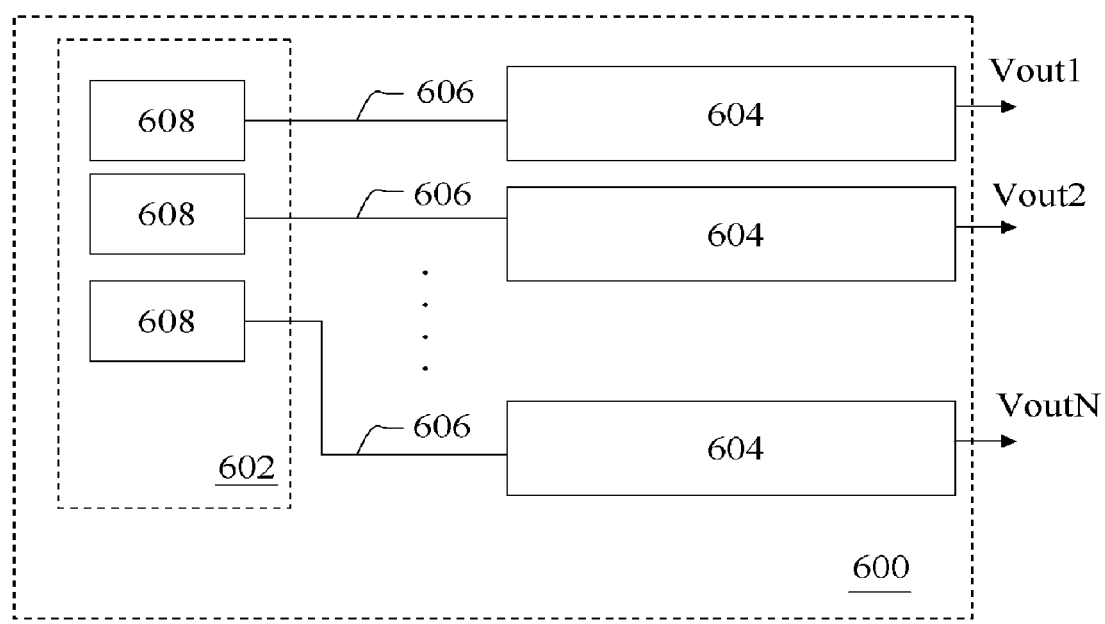
FIG. 6 is a block diagram schematically illustrating a power supply system according to an embodiment of the present invention.

In another embodiment, the present invention discloses a power supply system. FIG. 6 is a block diagram schematically illustrating a power supply system according to an embodiment of the present invention. Referring to FIG. 6, the power supply system 600 comprises a power system central controller 602 having at least one soft-starting circuit 608 and at least one remote PWM power regulators 604 for outputting Vout1-VoutN. Each of the remote PWM power regulators 604 is connected to the soft-starting circuit 608 via a control signal wire 606, wherein the control signal wire 606 has only one signal wire. In a preferred embodiment of the present invention, the remote PWM power regulator 604 is composed of the remote PWM power regulator 400 shown in FIG. 4.

Figure 1:
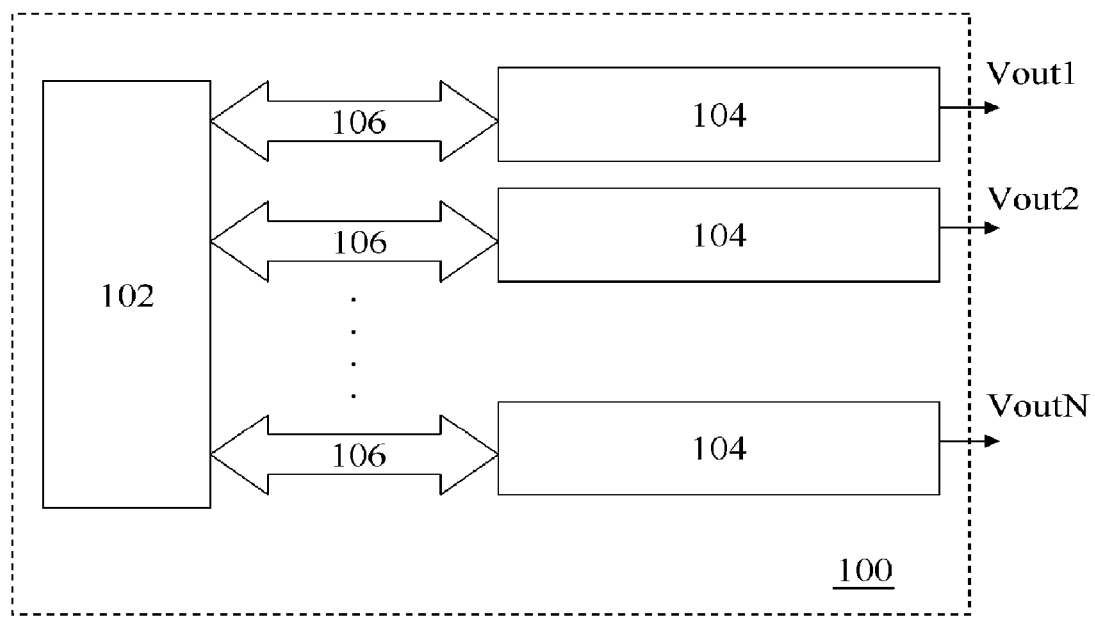
FIG. 1 is a schematic drawing illustrating a conventional power supply system.
Figure 2:
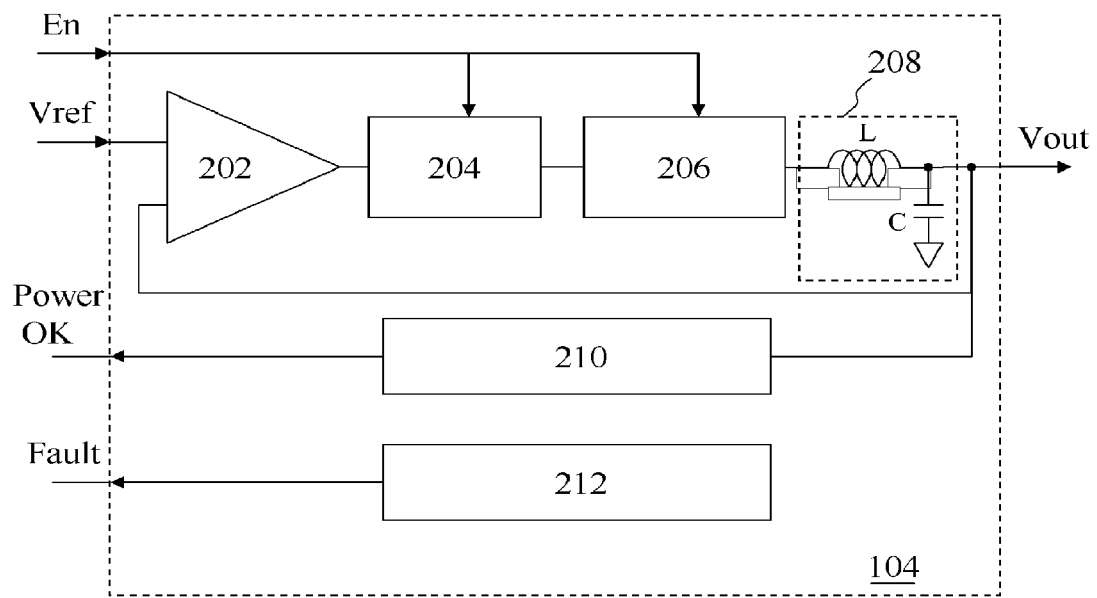
FIG. 2 is a circuit block diagram illustrating a conventional remote controlled PWM power regulator of a power supply system.
Figure 3:
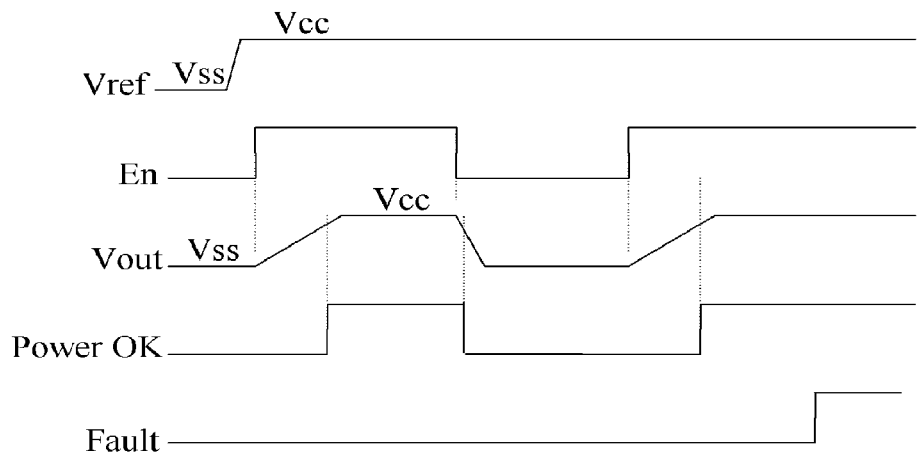
FIG. 3 is a waveform diagram illustrating the signals transmitted between the central controller and the remote PWM power regulator of a conventional power supply system.

The signals used in a conventional power supply system include a reference voltage Vref, an enable signal En, and a power OK signal Power OK, and a fault condition signal Fault. Hereinafter, the function of the power supply system 600 that includes all the functions of the conventional power supply will be described in detail. Referring to FIG. 2, the function of the conventional reference voltage Vref is to provide a reference voltage to the clamp circuit 204 of the PWM power regulator is achieved by the control signal Vctrl of the invention. Referring to FIG. 5, a soft-rising control signal Vctrl has a target voltage Vcc provided by the soft-starting circuit 608. In the present invention, each soft-starting circuit 608 can generate the same or different control signals Vctrl. For example, the control signals Vctrl having different voltages and timing waveforms can be used to control the PWM power regulator 604. Referring to FIG. 2, the function of the conventional enable signal En is to provide an enable signal to the PWM power regulator provided by the internal enable signal IntEn. As to the conventional Power OK signal, the power system central controller 602 can detect conditions of the output voltage Vout of the PWM power regulator 604 using the control signal Vctrl. When the PWM power regulator 604 is normally operated without any fault condition, the waveform of the output voltage Vout is substantially identical to the waveform of the control signal Vctrl. When a fault condition is detected in the PWM power regulator 604, the control signal Vctrl will be grounded and thus the power system central controller 602 is capable of detecting the fault of the PWM power regulator 604 without requiring the Power OK signal. As to the conventional fault condition signal Fault, the fault detection circuit 412 of the remote PWM power regulator 604 of the present invention will output an internal fault signal IntFault to ground the control signal Vctrl when a fault condition is detected within the power regulator 606. Therefore, the power system central controller 602 is capable of detecting the fault of the power regulator 606 by the grounded control signal Vctrl.

Accordingly, the power supply system and the remote control PWM signal regulator of the invention have at least the following advantages. First, the control signal wire of the present invention only requires a signal wire for transforming the control signal compared to the prior art control signal wire which requires at least four signal wires. Secondly, the present invention uses at least one soft-starting circuit within the central controller of the power supply system for outputting the control signal to the PWM power regulator and therefore, the PWM signal regulator of the present invention does not require the soft-starting clamp circuit, and therefore the circuit design of the PWM signal regulator can be simplified. Moreover, the PWM signal regulators that have the same waveform of output voltage may use the same soft-starting circuit. Thirdly, the central controller of the power supply system is capable of detecting the condition of the output voltage of the PWM signal regulator by detecting the control signal without requiring any additional conventional Power OK signal wire. Fourthly, when any fault condition is detected within the remote control PWM signal regulator, the control signal is grounded. The central controller can detect the grounded control signal determine the fault of the PWM power regulator without requiring any additional conventional fault signal wire.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims mid their equivalents.

What is claimed is:

1. A pulse width modulation (PWM) power regulator, comprising:
   an error amplifier, for receiving a control signal via a control signal wire and an output voltage of the PWM power regulator;
   a comparative circuit, connected to the control signal wire, for outputting an internal enable signal according to a pre-set threshold voltage; and
   a PWM output state, connected to the error amplifier and the comparative circuit, outputting the output voltage according to a triggering of the internal enable signal.

2. The PWM power regulator of claim 1, further comprising:
   a filter connected to the PWM output stage for filtering the output voltage.

3. The PWM power regulator of claim 1, wherein the error amplifier has a common mode input range.

4. The PWM power regulator of claim 3, wherein the common mode input range is in a range of about 0V to about a target voltage.

5. The PWM power regulator of claim 1, wherein the pre-set threshold voltage is in a range of about 5% to about 10% of a target voltage.

6. The PWM power regulator of claim 1, wherein the pre-set threshold voltage is in a range of about 0.05 V to about 0.5 V.

7. The PWM power regulator of claim 1, wherein a switch is connected to the control signal wire and a ground.

8. The PWM power regulator of claim 7, wherein a fault detection circuit, connected to the switch, for outputting an internal fault signal to trigger the switch to ground the control signal when a fault condition within the PWM signal power regulator is detected.

9. A power supply system, comprising:
   a central controller, having at least one soft-starting circuit; and
   at least one pulse width modulation (PWM) power regulator, wherein the PWM power regulator comprises:
   an error amplifier, for receiving a control signal via a control signal wire and an output voltage of the PWM power regulator;
   a comparative circuit, connected to the control signal wire for outputting an internal enable signal according to a predetermined threshold voltage; and
   a PWM output state, connected to the error amplifier and the comparative circuit for outputting the output voltage according to a triggering of the internal enable signal.

10. The power supply system of claim 9, wherein the control signal wire has only one signal wire.

11. The power supply system of claim 9, wherein the PWM signal power regulator further comprises:
    a filter connected to the PWM output stage for filtering the output voltage.

12. The power supply system of claim 9, wherein the error amplifier has a common mode input range.

13. The power supply system of claim 12, wherein the common mode input range is in a range of about 0V to about a target voltage.

14. The power supply system of claim 9, wherein the pre-set threshold voltage is in a range of about 5% to about 10% of a target voltage.

15. The power supply system of claim 9, wherein the pre-set threshold voltage is in a range of about 0.05V to about 0.5V.

16. The power supply system of claim 9, wherein a switch is connected to the control signal wire and a ground.

17. The power supply system of claim 16, wherein a fault detection circuit, connected to the switch, is for outputting an internal fault signal to trigger the switch to ground the control signal when a fault condition within the PWM signal power regulator is detected.

* * * * *